United States Patent [19]

Wallis

[11] Patent Number: 4,628,796
[45] Date of Patent: Dec. 16, 1986

[54] NITROGEN DIE CYLINDER

[76] Inventor: Bernard J. Wallis, 22315 Kean Ave., Dearborn, Mich. 48124

[21] Appl. No.: 620,680

[22] Filed: Jun. 14, 1984

[51] Int. Cl.⁴ ............................................. F01B 15/00
[52] U.S. Cl. .................... 92/117 R; 92/128; 92/134; 92/165 PR; 267/119; 267/130
[58] Field of Search .......... 92/165 PR, 117 R, 117 A, 92/134, 128; 267/130, 119; 188/322.17

[56] References Cited

U.S. PATENT DOCUMENTS

| | | | |
|---|---|---|---|
| 2,223,915 | 8/1939 | Lambert | 92/117 R |
| 2,549,689 | 4/1951 | Jurs, Jr. | 92/117 R |
| 4,005,763 | 2/1977 | Wallis | 267/119 |

Primary Examiner—Robert E. Garrett
Assistant Examiner—Mark A. Williamson
Attorney, Agent, or Firm—Barnes Kisselle Raisch Choate Whittemore & Hulbert

[57] ABSTRACT

A nitrogen die piston-cylinder unit has a central post threaded at one end into a nitrogen manifold. The piston has an axial bore therethrough. A sleeve closed at one end is telescoped over the free end of the post and is vertically slideable thereon. The upper end of the post has an annular seal thereon in sliding sealed engagement with the bore of the sleeve. A key and keyway formed on the inside of the sleeve and the outside of the post are arranged to interengage when the sleeve is fully telescoped over the post to prevent relative rotation therebetween. The exposed end face of the sleeve is formed with recesses adapted to be engaged by a spanner wrench to enable the unit to be removed from the threaded port of the manifold when the key is engaged with the keyway.

13 Claims, 9 Drawing Figures

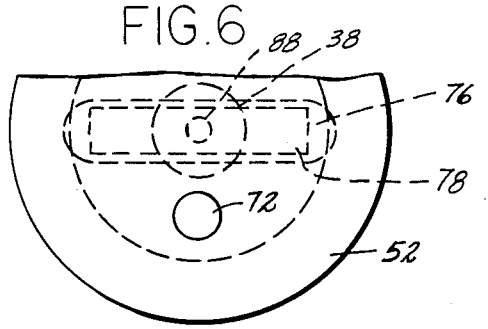
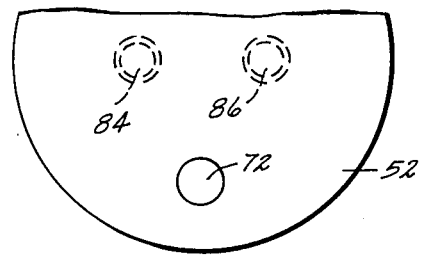
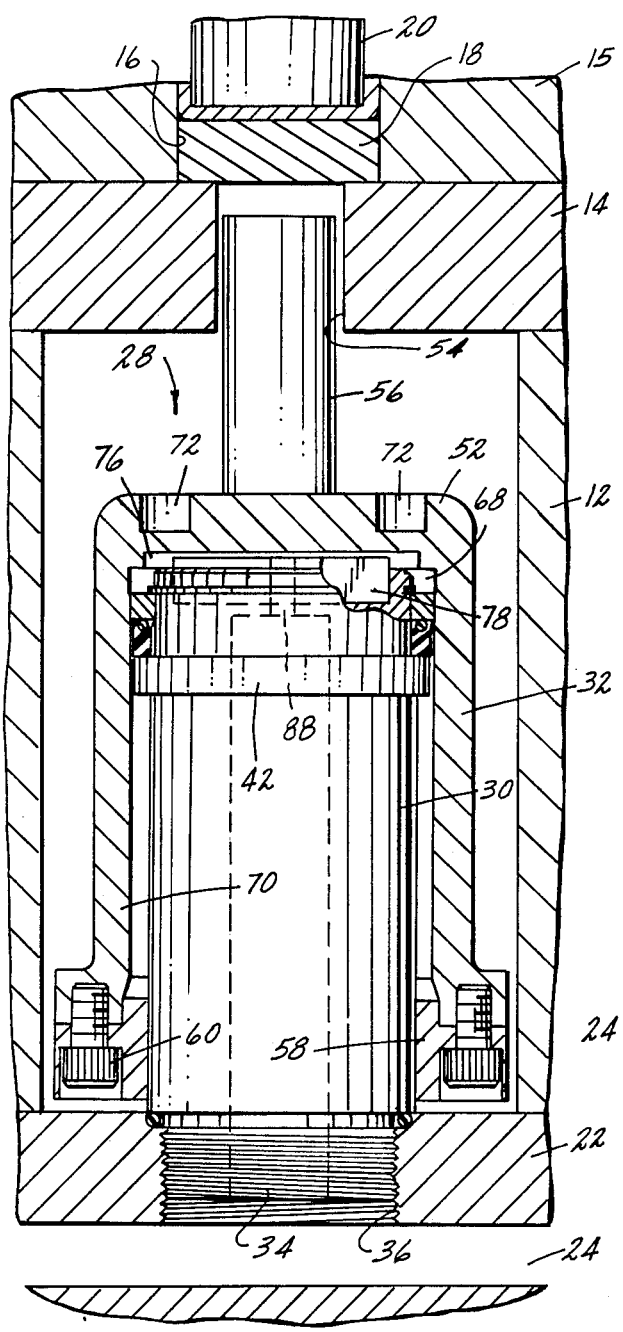
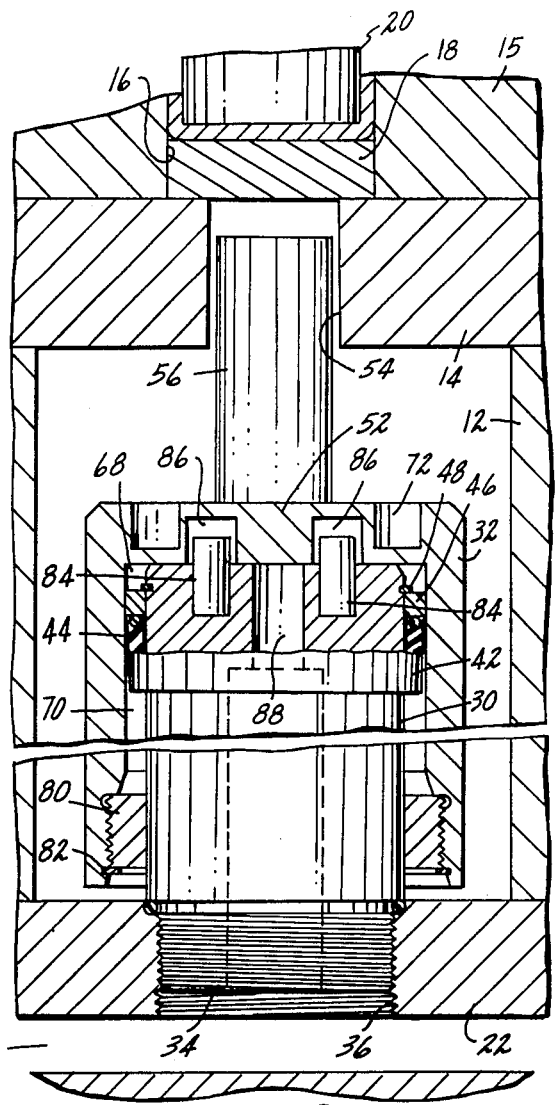
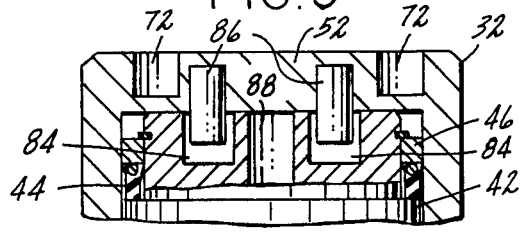

NITROGEN DIE CYLINDER

This invention relates to a nitrogen die cylinder.

In stamping press operations it is common practice to employ die springs in the form of a fluid cylinder charged with nitrogen under relatively high pressure. The nitrogen cylinder usually comprises an open-ended cylinder in which is slideably arranged a piston having a rod which projects axially outwardly through the open end of the cylinder. The piston rod normally has a diameter less than the piston and cylinder bore so that an annular space is formed between the piston rod and the surrounding cylinder bore. The open end of the cylinder is frequently provided with a wiper and/or an annular seal to seal the nitrogen within the cylinder and to seal the annular chamber from the surrounding atmosphere. In many instances the environment around a die is contaminated with oil, dirt, grinding dust, etc. which, if permitted to leak into the cylinder, can cause serious problems in a relatively short period of time. Seals and wipers are not always effective to prevent the ingress of such contaminants into conventionally constructed die cylinders.

Another problem sometimes encountered with die cylinders relates to the lack of space. In some applications, in order to apply the large force required to the movable die element against which the cylinder is acting, the cross sectional area of the piston must be maximized and/or the number of cylinders employed must be numerous. This requirement frequently results in design problems with respect to size limitations inherent in some dies and the lack of adequate space between cylinders for access to them when they require servicing or replacement.

The present invention has for its primary object the provision of a nitrogen die cylinder which overcomes the problems referred to above.

Another object of this invention is to provide a compact die cylinder which occupies a minimum of space in relation to the force it is adapted to exert.

A further object of the invention is to provide a die cylinder arrangement wherein the seal between the piston and the cylinder is effectively shielded from the contaminants in the surrounding environment.

Another object of the invention is to provide a nitrogen die cylinder unit in the form of a post designed to be threaded into a port on a nitrogen manifold and a sleeve telescoped over the post and slideable axially thereon together with means for locking the sleeve against rotation on the post to enable removal of the unit from a manifold by gripping the sleeve externally with a turning tool.

Other objects, features and advantages of the present invention will become apparent from the following description and accompanying drawings, in which:

FIG. 5 is a view similar to FIG. 1 and showing a third embodiment of a die cylinder according to the present invention;

FIG. 6 is a fragmentary top view of the cylinder unit shown in FIG. 5;

FIG. 7 is a view similar to FIG. 1 and showing a fourth embodiment of a nitrogen die cylinder according to the present invention;

FIG. 8 is a fragmentary top view of the cylinder unit shown in FIG. 7; and

FIG. 9 is a fragmentary vertical sectional view of a fifth embodiment of a nitrogen die cylinder according to the present invention.

Figure 1:
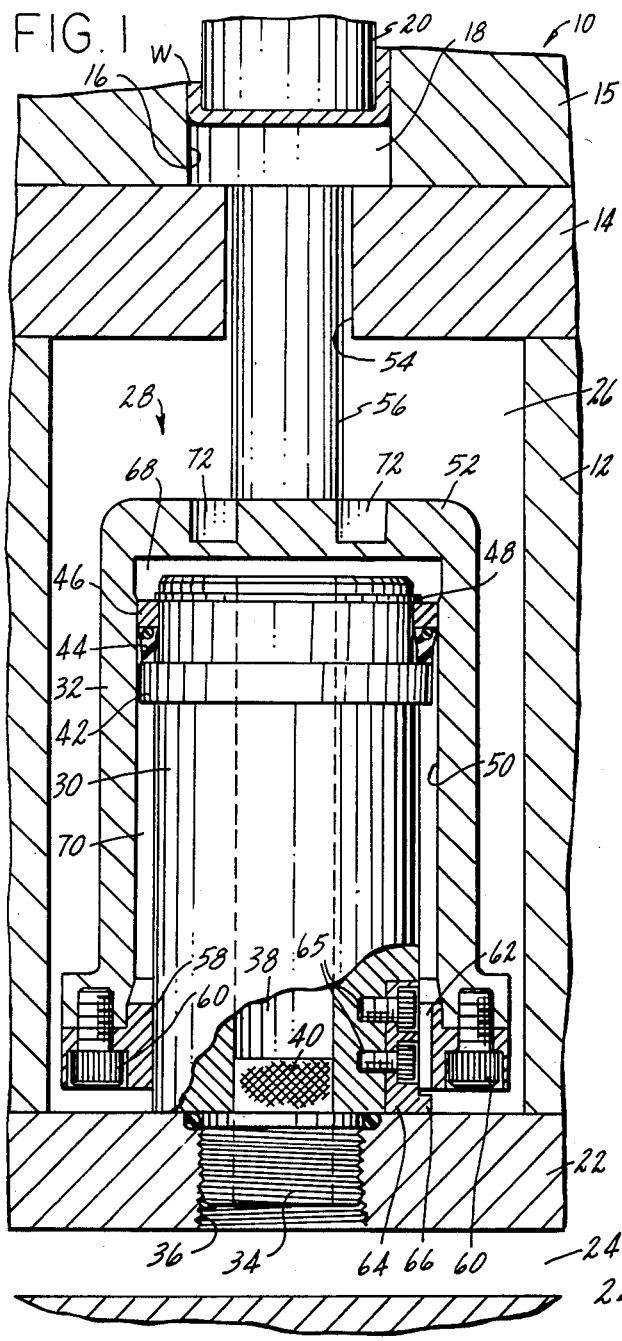
FIG. 1 is a vertical sectional view of one form of nitrogen die cylinder according to the present invention assembled with a die.

Referring to FIG. 1, a die is illustrated at 10 which includes a riser 12 on which die members 14, 15 are supported. Die member 15 is formed with a cavity 16 in which a stripper pad 18 is arranged for sliding movement. A punch 20 is axially aligned with cavity 16 and is reciprocated vertically by a press ram (not illustrated). Punch 20 has a cross section slightly smaller than cavity 16 so that, when the punch descends into the cavity, the workpiece W is formed to the desired configuration. Riser 12 is supported on the top wall of a manifold 22 having a passageway 24 therein which is charged with nitrogen at a relatively high pressure; for example, 1000 p.s.i.

Riser 12 is formed with a vertically extending, cylindrical pocket 26 in which a cylinder unit 28 is arranged. The unit 28 includes a center post 30 over the upper end of which is telescoped a cylindrical sleeve 32. Post 30 has a threaded boss 34 at its lower end which is in sealed engagement with a threaded port 36 in the top wall of manifold 22. The post is formed with an axial through passageway 38 in which an oil-soaked wick 40 is retained.

Adjacent its upper free end post 30 is formed with an annular, radially outwardly extending shoulder 42. On the top side of shoulder 42 there is arranged an annular seal 44 and a bronze bearing bushing 46. Seal 44 and bushing 46 are retained in assembled relation on shoulder 42 by means of a snap ring 48.

Sleeve 32 is formed with a bore 50 closed at its upper end by an end wall 52. Bore 50 has a diameter larger than the outer diameter of post 30. The outer diameter of sleeve 32 is slightly smaller than the diameter of pocket 26. Die member 14 is formed with a through aperture 54 axially aligned with, out of smaller diameter than, stripper pad 18. A die pin 56 extends upwardly from the top wall of sleeve 30 through aperture 54 with its upper end abutting against the bottom face of stripper pad 18.

The lower end of sleeve 32 has a bronze bearing bushing 58 secured thereto as by screws 60. The inner periphery of bushing 58 has a sliding fit with the outer periphery of post 30. At one side thereof the inner periphery of bushing 58 is formed with an axially extending keyway 62. An insert 64 is recessed into the outer periphery of post 30 adjacent its lower end and is secured thereto by screws 65. The lower end of insert 64 is formed with a short, radially outwardly projecting key 66 which is adapted to engage keyway 62 when sleeve 32 is telescoped fully over the end of post 30.

In the arrangement shown in FIG. 1 (and also in FIG. 3) the unit 28 is illustrated in the pressurized condition. In this condition, when the press ram is in the bottom dead center position, sleeve 32 assumes a position shifted upwardly a slight amount on post 30 so that pin 56 is engaged between pressure pad 18 and the top wall 52 of sleeve 32. Likewise, bushing 58 is spaced slightly upwardly above the upper face of the top wall of manifold 22 and the under face of top wall 52 of sleeve 32 is spaced slightly above the upper end of post 30. With sleeve 32 in this position keyway 62 is spaced slightly above and out of engagement with the short key 66 on post 30. Thus, in the condition of the unit shown in FIG. 1 sleeve 32 is free to rotate on post 30.

It will be observed that seal 44 divides the bore 50 of sleeve 32 into two chambers, one above the shoulder 42 and one below the shoulder 42. The chamber 68 above shoulder 42 is at all times in communication with manifold passage 24 through the central passageway 38 in post 30. The annular passageway 70 formed between the outer periphery of post 30 and bore 50 communicates with the surrounding atmosphere through keyway 62 and the inner periphery of bushing 58 which has a sliding fit on post 30.

When the piston-cylinder unit 28 is assembled in a die as shown in the drawings and manifold 22 is charged with nitrogen at a pressure of, for example, 1,000 p.s.i., this pressure acts upwardly against the underside of wall 52 across the entire cross sectional area of bore 50. This urges sleeve 32 upwardly so that the die pin 56 biases pad 18 upwardly as the punch 20 reciprocates vertically. Thus, the cross sectional area of sleeve 32 effective for applying an upward force on stripper pad 18 is equal to the cross sectional area of sleeve 32 less only the cross sectional area of the thin depending skirt wall of the sleeve. This enables the unit to exert a maximum upward force on pad 18 in relation to its cross sectional area. In addition, it will be noted that, since seal 44 is located at the upper end of the stationary post 30, it is virtually impossible for any contaminants in the surrounding environment, such as dirt, grinding dust, oil, etc., to reach seal 44 and leak into chamber 68.

When it is desired to service the unit or to remove it from the die, the pressure in manifold 22 is relieved to the surrounding atmosphere so that the pressure in chamber 68 is reduced to atmospheric. When the pressure is so relieved, sleeve 32 will gravitate downwardly and can be rotated, if necessary, to interengage keyway 62 with key 66. When keyway 62 and key 66 are axially aligned, sleeve 32 can be pushed downwardly to a position wherein key 66 is fully engaged with keyway 62. In this condition post 30 becomes rotationally locked with sleeve 32. Thereafter a spanner wrench or other turning tool can be engaged with sockets 72 on the upper face of end wall 52 to rotate the entire unit and thereby remove it from the manifold.

Figure 2:
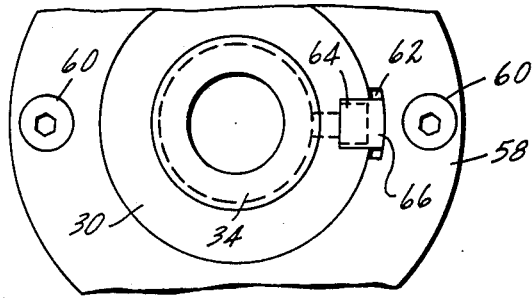
FIG. 2 is a fragmentary bottom view of the cylinder unit shown in FIG. 1.
Figure 3:
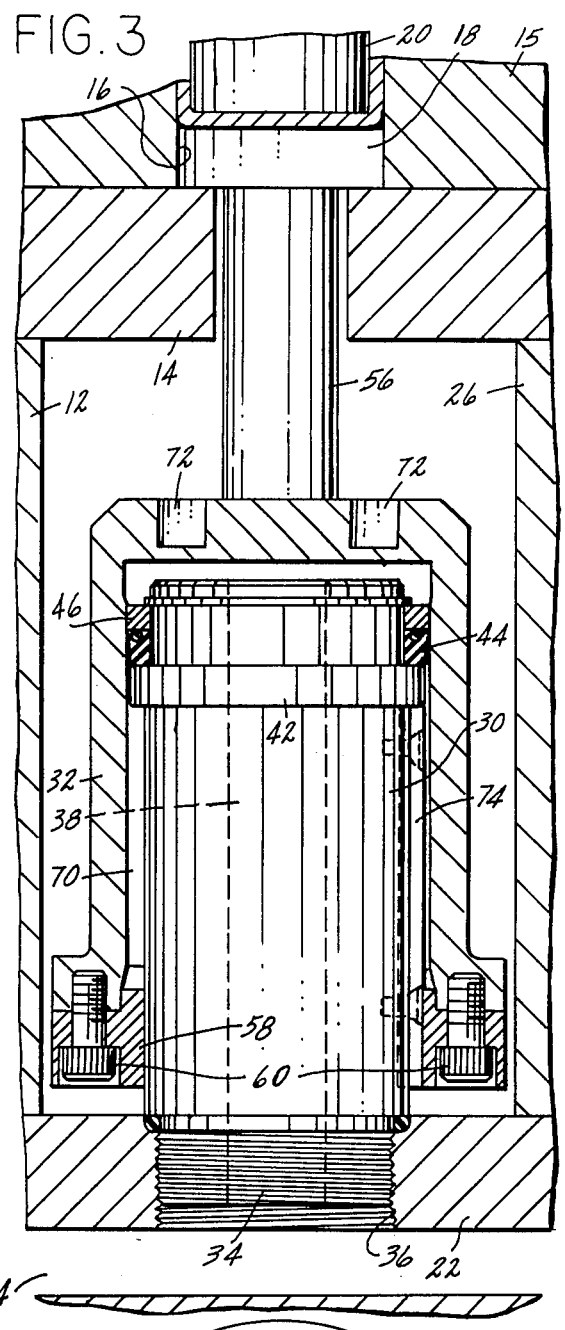
FIG. 3 is a view similar to FIG. 1 and showing a second embodiment of the invention.
Figure 4:
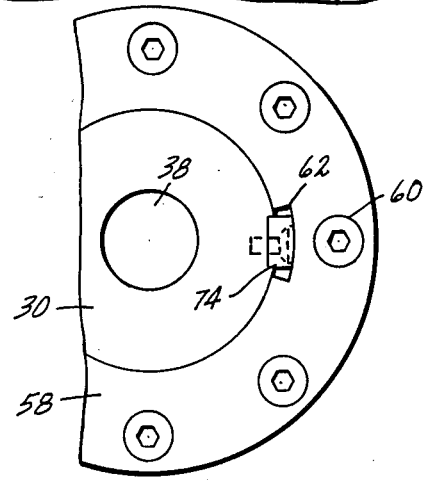
FIG. 4 is a fragmentary bottom view of the cylinder unit illustrated in FIG. 3.

The arrangement shown in FIGS. 3 and 4 differs only slightly from that shown in FIGS. 1 and 2. The difference between these two embodiments resides solely in that the key 74 in the arrangement shown in FIGS. 3 and 4 extends substantially the full length of post 30 below shoulder 42. However, keyway 62 has a circumferential extent somewhat greater than the circumferential extent of key 74 as shown in FIG. 4 so that sleeve 32 is, at all times, permitted to rotate at least slightly on post 30. A slight freedom of movement of sleeve 32 on post 30 is desirable since it permits seal 44 to seat properly with respect to the bore 50 and thus extends the life of the seal.

The cylinder unit illustrated in FIGS. 5 and 6 differs from those previously described in that the key and keyway arrangement are arranged at the upper end of the unit rather than the lower end of the unit. Thus, the underside of wall 52 is formed with a shallow diametrically extending slot 76 and on the upper end of post 30 there is arranged a diametrically extending key 78. Key 78 has a width slightly less than the width of slot 76 so that, when the key is engaged in the slot, sleeve 32 is permitted to rotate at least slightly on post 30. In the condition shown in FIG. 5 the pressure in the piston-cylinder unit 28 is relieved and sleeve 32 is shown in the interlocked position with post 30. When the unit is pressurized, sleeve 32 will be shifted upwardly so that the upper end of die pin 56 abuts the lower face of stripper pad 18 and seat 76 will be disengaged from key 78.

The arrangement shown in FIGS. 7 and 8 differs only slightly from that shown in FIGS. 5 and 6. In FIG. 7 the bushing 80 is threaded into the lower end of the sleeve 32 and retained therein by a snap ring 82. In addition, the key and keyway arrangement is in the form of a pair of pins 84 projecting upwardly from the upper end of post 30 and engageable with a pair of axially aligned recesses 86 on the underside of end wall 52. The diameter of pins 84 is slightly less than the diameter of recesses 86 so that, even when the pins 84 are engaged in the recesses 86, sleeve 32 can rotate at least slightly on post 30.

The modification shown in FIG. 9 is substantially identical with that shown in FIGS. 7 and 8 except that the pins 84 project downwardly from the end wall 52 and the recesses 86 are formed in the upper end of post 30.

In each of the embodiments illustrated and described it will be observed that the piston-cylinder unit can be located in a closely confined space, such as a pocket illustrated at 26, and, nevertheless, it can be threaded into or removed from the manifold in a relatively simple manner without removing the riser 12 from the manifold. When the sleeve 32 is shifted downwardly to its lowermost position, the key and keyway arrangement on the sleeve and post interengage to interlock them against relative rotation. Thereafter, a spanner wrench or other turning tool can be engaged with the sockets 72 at the upper end of sleeve 32 to rotate the sleeve and thereby engage it or remove it from the threaded port 36 in the manifold. In addition, it will be noted that, since seal 44 is located at the upper end of post 30, it is effectively protected by the closed end sleeve 32 from contaminants in the environment surrounding the die.

I claim:

1. In combination a die having a vertically movable member, a nitrogen manifold having a top wall spaced vertically below said movable die member, means extending vertically between the top wall of said manifold and said vertically movable die member and biasing said movable die member upwardly, said biasing means including a piston-cylinder assembly, the top wall of said manifold having a threaded port therein, said assembly including a vertically extending cylindrical post having a piston thereon adjacent its upper end and also having an axially extending passageway therethrough, the lower end of said post member being threaded into the threaded port on the top wall of the manifold and sealed therein, said assembly also including a cylindrical sleeve member having an axially extending bore therein, the lower end of said sleeve being open and the upper end of the sleeve being closed by an end wall, the open end of the sleeve member being telescoped over the free end of the post member so that the sleeve member is axially slideable vertically on the post member, said post member having at the free end portion thereof an annular bushing and an annular seal, said sleeve member also having an annular bushing thereon adjacent its open end, said bushings guiding the sleeve member for axial sliding movement on the post member, said annular seal being in sealing engagement with the outer periphery of the post number and with the bore of said sleeve member, means fixed on and extending vertically upwardly from the top wall of said manifold, said last-mentioned means surrounding said post member and obstructing lateral access to the periphery of the post member adjacent the lower end thereof above the threaded connection with the manifold, a key on one of said members and a keyway on the other member, said key and keyway being adapted to be interengaged when the sleeve member is telescoped substantially fully over said post member, said key and keyway interlocking the post and sleeve members against free relative rotation therebetween when interengaged and means on the exterior of the sleeve member adapted to be gripped by a turning tool for engaging and disengaging the threaded end of the post member with the threaded port in the manifold when the sleeve and post members are substantially fully telescoped.

2. The combination called for in claim 1 wherein the key and keyway project radially of the cylindrical post and are disposed adjacent the open end of sleeve member and the threaded end of the post member.

3. The combination called for in claim 2 wherein the key is located on the post member directly adjacent the threaded end thereof and the keyway is located on the sleeve member directly adjacent the open end thereof.

4. The combination called for in claim 3 wherein the key has a relatively short axial extent so that the keyway shifts axially out of engagement with the key when the sleeve member is shifted axially slightly from its fully telescoped position on the post member.

5. A nitrogen die cylinder as called for in claim 2 wherein the key is located on and extends axially along a major portion of the length of the post member and the keyway has a circumferential extent slightly greater than the circumferential extent of the key so that the sleeve member has limited circumferential movement relative to the post member when the keyway is engaged by the key.

6. The combination called for in claim 2 wherein said keyway is formed on the bushing adjacent the open end of the sleeve member.

7. The combination called for in claim 1 wherein said last-mentioned means are formed on the end wall of the sleeve member.

8. The combination called for in claim 7 wherein said last-mentioned means comprise recesses in the upper face of said end wall.

9. A nitrogen die cylinder as called for in claim 1 wherein said keyway and key comprise an axially extending recess and an axially extending pin in the end wall of the sleeve member and on the free end of the post member.

10. A nitrogen die cylinder as called for in claim 9 wherein the axial extents of said recess and pin are such that the pin is disengaged from the recess when the sleeve member is shifted axially slightly from its fully telescoped position on the post member.

11. A nitrogen die cylinder as called for in claim 1 wherein the keyway and key comprise a radially extending groove and a radially extending projection on the inner face of said end wall and the adjacent end face of the post member.

12. A nitrogen die cylinder as called for in claim 11 wherein the groove is formed on the inner face of the end wall and the projection is located on the adjacent end face of the post member.

13. The combination called for in claim 1 wherein said key and keyway are relatively positioned on said post and sleeve such as to be interengageable only when the sleeve and post members are substantially fully telescoped, said sleeve being rotatable on said post when the key and keyway are disengaged.

* * * * *